(12) United States Patent
Mayhew et al.

US009137173B2

(10) Patent No.: US 9,137,173 B2
(45) Date of Patent: Sep. 15, 2015

(54) DEVICES AND METHODS FOR INTERCONNECTING SERVER NODES

(75) Inventors: David E. Mayhew, Northborough, MA (US); Mark Hummel, Franklin, MA (US); Michael J. Osborn, Hollis, NH (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 174 days.

(21) Appl. No.: 13/526,973

(22) Filed: Jun. 19, 2012

(65) Prior Publication Data

US 2013/0339466 A1    Dec. 19, 2013

(51) Int. Cl.
*G06F 15/173*    (2006.01)
*H04L 12/933*    (2013.01)

(52) U.S. Cl.
CPC .................................... *H04L 49/103* (2013.01)

(58) Field of Classification Search
USPC .................... 709/220, 234; 370/360; 345/501
See application file for complete search history.

(56) References Cited

U.S. PATENT DOCUMENTS

| | | | |
|---|---|---|---|
| 4,740,894 A * | 4/1988 | Lyon ............................. | 711/149 |
| 5,191,647 A * | 3/1993 | Masaki ......................... | 345/501 |
| 5,790,541 A | 8/1998 | Patrick et al. | |
| 5,857,078 A * | 1/1999 | Date ............................. | 709/234 |
| 6,208,081 B1 * | 3/2001 | Eo et al. ...................... | 315/169.1 |
| 6,510,161 B2 * | 1/2003 | Trevitt et al. ................. | 370/412 |
| 6,785,892 B1 | 8/2004 | Miller et al. | |
| 6,795,886 B1 | 9/2004 | Nguyen | |
| 6,823,453 B1 | 11/2004 | Hagerman | |
| 6,850,987 B1 | 2/2005 | McCanne et al. | |
| 7,415,594 B2 * | 8/2008 | Doerr et al. .................... | 712/15 |
| 7,421,532 B2 | 9/2008 | Stewart et al. | |
| 7,480,303 B1 | 1/2009 | Ngai | |
| 7,502,840 B1 | 3/2009 | Bakke | |
| 7,567,556 B2 * | 7/2009 | Beshai ......................... | 370/360 |
| 7,568,074 B1 * | 7/2009 | Kavipurapu et al. ......... | 711/147 |
| 7,814,259 B2 | 10/2010 | Stewart et al. | |
| 7,913,019 B2 | 3/2011 | Inagawa et al. | |

(Continued)

FOREIGN PATENT DOCUMENTS

EP        0581486        2/1994

OTHER PUBLICATIONS

International Search Report & Written Opinion in related International application No. PCT/US2013/044278, mailed on Sep. 19, 2013; 1-48 pages.

(Continued)

*Primary Examiner* — Tammy Nguyen
(74) *Attorney, Agent, or Firm* — Park, Vaughan, Fleming & Dowler LLP (57) ABSTRACT

Described are aggregation devices and methods for interconnecting server nodes. The aggregation device can include an input region, an output region, and a memory switch. The input region includes a plurality of input ports. The memory switch has a shared through silicon via (TSV) memory coupled to the input ports for temporarily storing data received at the input ports from a plurality of source devices. The output region includes a plurality of output ports coupled to the TSV memory. The output ports provide the data to a plurality of destination devices. A memory allocation system coordinates a transfer of the data from the source devices to the TSV memory. The output ports receive and process the data from the TSV memory independently of a communication from the input ports.

9 Claims, 8 Drawing Sheets

(56) References Cited

U.S. PATENT DOCUMENTS

| | | | |
|---|---|---|---|
| 7,913,027 B2 | 3/2011 | Kloeppner et al. | |
| 7,925,802 B2* | 4/2011 | Lauterbach et al. | 710/38 |
| 2002/0069318 A1 | 6/2002 | Chow et al. | |
| 2002/0087751 A1 | 7/2002 | Chong | |
| 2003/0123468 A1 | 7/2003 | Nong | |
| 2004/0258062 A1 | 12/2004 | Narvaez | |
| 2005/0117578 A1 | 6/2005 | Stewart et al. | |
| 2006/0282547 A1 | 12/2006 | Hasha et al. | |
| 2007/0162572 A1 | 7/2007 | Aloni et al. | |
| 2007/0283128 A1 | 12/2007 | Hoshaku | |
| 2008/0005624 A1 | 1/2008 | Kakivaya et al. | |
| 2008/0028467 A1 | 1/2008 | Kommareddy et al. | |
| 2008/0320181 A1* | 12/2008 | Lauterbach et al. | 710/38 |
| 2009/0070405 A1 | 3/2009 | Mazzaferri | |
| 2009/0175276 A1 | 7/2009 | Tsuge et al. | |
| 2009/0216920 A1* | 8/2009 | Lauterbach et al. | 710/36 |
| 2009/0292813 A1 | 11/2009 | Snively et al. | |
| 2009/0323710 A1 | 12/2009 | Shahar et al. | |
| 2010/0142560 A1 | 6/2010 | Sharivker et al. | |
| 2010/0172172 A1 | 7/2010 | Kim et al. | |
| 2010/0241722 A1 | 9/2010 | Seminaro et al. | |
| 2010/0250717 A1 | 9/2010 | Akagi | |
| 2010/0272117 A1 | 10/2010 | Wu et al. | |
| 2011/0072204 A1 | 3/2011 | Chang et al. | |
| 2011/0103245 A1 | 5/2011 | Lu | |
| 2011/0202701 A1 | 8/2011 | Maitra | |
| 2012/0033672 A1 | 2/2012 | Page et al. | |
| 2012/0243542 A1 | 9/2012 | Sugumar et al. | |
| 2012/0284712 A1 | 11/2012 | Nimmagadda et al. | |
| 2012/0291028 A1 | 11/2012 | Kidambi et al. | |
| 2012/0331065 A1 | 12/2012 | Aho et al. | |
| 2013/0258899 A1 | 10/2013 | Anantharam et al. | |

OTHER PUBLICATIONS

V. Kashyap; "IP Over InfiniBand (IPoIB) Architecture", The Internet Society; 2006; 22 pages.

University of Tennessee; "Message Passing Interface Forum"; Sep. 4, 2009, 647 pages.

International Search Report and Written Opinion in Related International Patent Application No. PCT/US13/40508, mailed Jul. 29, 2013; 14 pages.

Non-Final Office Action in related U.S. Appl. No. 13/470,847, mailed on Sep. 6, 2013; 22 pages.

Loi, et al., "A Low-overhead Fault Tolerance Scheme for TSV-based 3D Network on Chip Links", IEEE International Conference on Computer-Aided Design, Nov. 10, 2008, New Jersey, USA; 5 pages.

International Search Report & Written Opinion in related international patent application No. PCT/US13/44902, mailed on Oct. 14, 2013; 11 pages.

Non-Final Office Action in related U.S. Appl. No. 13/529,452, mailed on Dec. 17, 2013; 20 pages.

David E. Mayhew; Patent Application for "Memory Switch for Interconnecting Server Nodes", U.S. Appl. No. 13/529,452, filed Jun. 21, 2012.

Hummel et al.; Patent Application for "Server Node Interconnect Devices and Methods"; U.S. Appl. No. 13/470,847, filed May 14, 2012.

Whelihan, David et al.; "Memory Optimization in Single Chip Network Switch Fabrics"; Department of Electrical Engineering; Carnegie Mellon University, Pittsburgh, PA; Jun. 10-14, 2002; 6 pages.

Non-Final Office Action in related U.S. Appl. No. 13/529,452, mailed on Dec. 17, 2014; 20 pages.

Notice of Allowance in related U.S. Appl. No. 13/470,847, mailed on Apr. 14, 2014; 19 pages.

Non-Final Office Action in related U.S. Appl. No. 13/589,463, mailed on May 9, 2014; 12 pages.

Final Office Action in related U.S. Appl. No. 13/529,452, mailed on May 12, 2014; 23 pages.

Non-Final Office Action in related U.S. Appl. No. 13/675,401, mailed on Jan. 2, 2014; 20 pages.

International Search Report & Written Opinion for related international patent application No. PCT/US13/69572, mailed on Feb. 20, 2014; 14 pages.

Non-Final Office Action in related U.S. Appl. No. 13/602,512, mailed on Mar. 11, 2014; 18 pages.

Mayhew et al., "PCI Express and Advanced Switching: Evolutionary Path to Building Next Generation Interconnects", Proceedings from 11th Symposium on High Performance Interconnects, Aug. 20, 2003, pp. 21-29.

Tanenbaum A S ED, "Chapter 4", Computer Networks, Jan. 1, 1996, Prentice-Hall International, London, pp. 310-317.

* cited by examiner

DEVICES AND METHODS FOR INTERCONNECTING SERVER NODES

RELATED APPLICATIONS

This application is related to U.S. application Ser. No. 13/470,847, filed May 14, 2012, the content of which is incorporated herein by reference in its entirety.

FIELD OF THE INVENTION

The present invention relates generally to a network switch architecture, and more specifically, to aggregation devices and methods that interconnect server nodes or related processor complexes.

BACKGROUND

Data centers are generally centralized facilities that provide Internet and/or intranet services supporting businesses and organizations. A typical data center can house various types of electronic equipment, such as computers, domain name system (DNS) servers, network switches, routers, and data storage devices. A typical data center can have hundreds or thousands of interconnected servers communicating with each other and external devices via a switching architecture comprising the switches and routers. Conventional data centers can also be configured for virtualization, permitting servers or the like to share network interface cards (NICs), hard disk drives, or other hardware. A complex switch fabric can facilitate communications between the servers.

BRIEF SUMMARY OF EMBODIMENTS

In one aspect, there is provided an aggregation device comprising an input region, an output region, a memory switch, and a memory allocation system. The input region includes a plurality of input ports. The memory switch has a shared through silicon via (TSV) memory coupled to the input ports for temporarily storing data received at the input ports from a plurality of source devices. The output region includes a plurality of output ports coupled to the TSV memory. The output ports provide the data to a plurality of destination devices. The memory allocation system coordinates a transfer of the data from the source devices to the TSV memory. The output ports receive and process the data from the TSV memory independently of a communication from the input ports.

In another aspect, there is provided an aggregation device comprising a plurality of input ports, a plurality of output ports, and a shared through silicon via (TSV) memory between the input ports and the output ports. The aggregation device further comprises a memory output queue in communication with at least one output port of the plurality of output ports and a memory allocation system that coordinates a transfer of the data from the input ports to the output ports during a data transfer operation in accordance with a record in the memory output queue generated from the data.

In another aspect, there is provided a method for performing a data transfer operation. The method comprises writing data from a first electronic device to a TSV memory switch system; creating a record of the data written to the TSV memory switch system, the record including location information of the data at the TSV memory switch system; posting the record to a memory output queue; reading the record at the memory output queue; reading the data from the TSV memory switch system according to the record; and providing the data to a second electronic device.

In another aspect, there is provided a computer program product comprising a computer readable storage medium having computer readable program code embodied therewith. The computer readable program code comprises computer readable program code configured to write data from a first electronic device to a TSV memory switch system; computer readable program code configured to create a record of the data written to the TSV memory switch system, the record including location information of the data at the TSV memory switch system; computer readable program code configured to post the record to a memory output queue; computer readable program code configured to read the record at the memory output queue; computer readable program code configured to read the data from the TSV memory switch system according to the record; and computer readable program code configured to provide the data to a second electronic device.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF PREFERRED EMBODIMENTS

In the following description, specific details are set forth although it should be appreciated by one of ordinary skill that the systems and methods can be practiced without at least some of the details. In some instances, known features or processes are not described in detail so as not to obscure the present invention.

Figure 1:
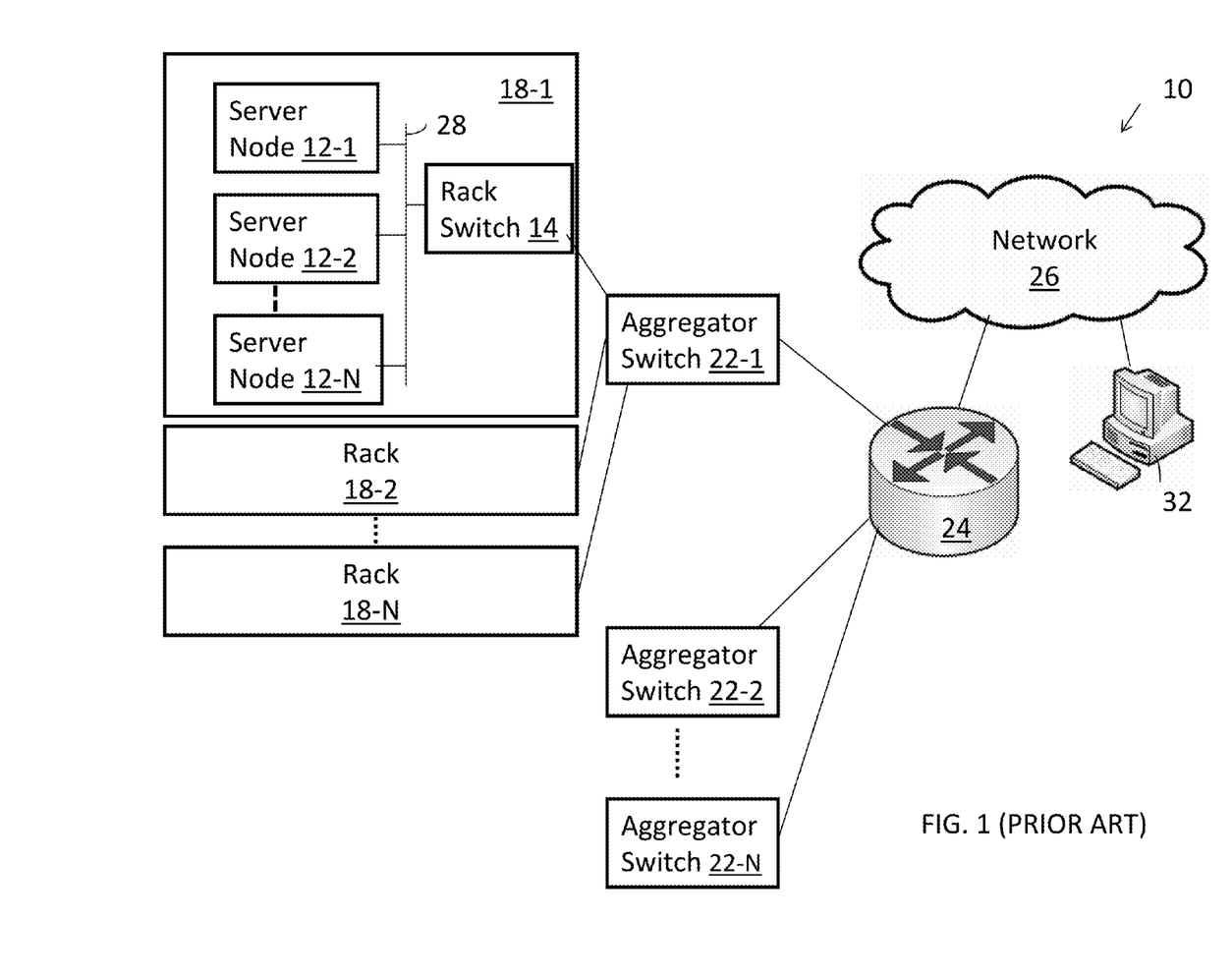
FIG. 1 is a block diagram of a conventional data center network hierarchy.

FIG. 1 is a block diagram of a conventional data center network hierarchy 10. The data center network hierarchy 10 includes a plurality of server nodes 12-1 to 12-N (N is an integer greater than 1), microservers, single socket servers (SSS), or other processor-based hardware device in communication with a rack switch 14 via a local area network (LAN) such as an Ethernet LAN or related data network in a rack 18-1. The rack 18-1 can be configured as part of a cluster with one or more other racks 18-2, 18-N (N is an integer greater than 1) in the data center network hierarchy 10. Each cluster can include an aggregation switch 22-1, 22-2, 22-N (N is an integer greater than 1), which is connected to a core router 24 via Ethernet or other network connection. A user computer 32, for example, a laptop, smartphone, or other electronic device, can exchange data with the server nodes 12 at high speeds via a network 26, for example, an IP network, the internet, and so on. A continuing desire exists to reduce to size, expense, and power requirements associated with such data center configurations.

Figure 2:
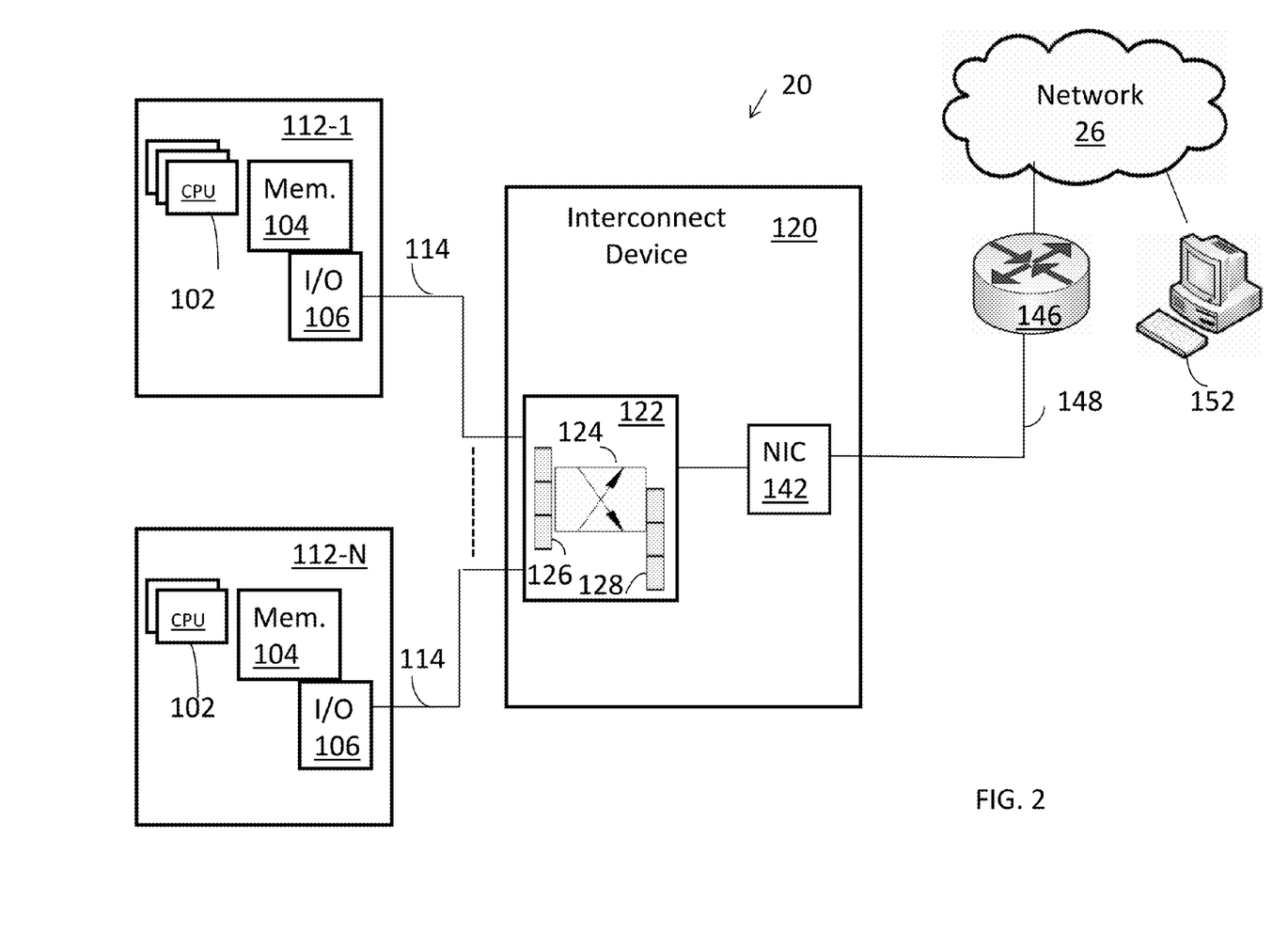
FIG. 2 is a block diagram of a data center including a plurality of server nodes coupled to an interconnect fabric device.

FIG. 2 is a block diagram of a data center 20 including a plurality of server nodes 112_1 through 112_N (N is an integer greater than 1) coupled to a conventional interconnect device 120. The interconnect device 120 can consolidate a number of aggregation switches and rack switches under a single device.

The server nodes 112_1 through 112_N (generally, 112) can be single socket servers or other low-power devices. Each server node 112 can include a processor 102, which can be one or more microprocessors, central processing units (CPUs), graphics processing units (GPUs), digital signal processors (DSPs), application-specific integrated circuits (ASICs), memory controllers, multi-core processors, or other types of data processing devices, or portions and combinations of these and other devices.

The server nodes 112 can include a local memory 104 and an I/O logic 106. The local memory 104 can be a non-volatile or volatile memory, for example, DRAM or static RAM (SRAM). The I/O logic 106 can be configured to include a southbridge or related I/O controller for managing data transfers between the server node 112 and the interconnect device 120, and for performing other computer I/O functions. The I/O logic 106 can include an Ethernet device driver, PCIe connector, or other network connector for establishing a communication path 114 with the interconnect device 120.

The interconnect device 120 includes a multi-port switch fabric 122 that provides data interconnections between the server nodes 112. In particular, the switch fabric 122 includes a plurality of input ports (not shown), a plurality of output ports (not shown), and a crossbar 124 that can route data packets, cells, and the like between the input ports and the output ports, facilitating communication between the server nodes 112 and/or shared devices such as a physical NIC 142. The interconnect device 120 via the NIC 142 can communicate with a user computer 152 via a router 146 coupled between a network 26 and a network bus (not shown), for example, an Ethernet bus, a PCIe bus, or other peripheral bus known to those of ordinary skill in the art.

The crossbar 124 is typically organized into an array of rows and columns. Several input ports on a given row can compete for an output port at a column. The input ports can include an input buffer 126 that temporarily stores data received from the server nodes 112 until the crossbar 124 can deliver the data to an available output port. The output ports can include an output buffer 128 for temporarily storing data received from one or more input ports until the desired output port is available to output the data from the switch fabric 122.

A disadvantage with crossbar switches is that the crossbar 124 exposes the switch fabric 122 to congestion-related issues such as head-of-line (HOL) blocking. A related issue is the inefficient use of bandwidth between the server nodes 112 and the interconnect device 120 arising from buffer overrun and/or underrun conditions. The input and output buffers 126, 128 can fill up quickly and be unable to keep up with the receipt of data from multiple input ports, resulting in undesirable latency, jitter, or packet loss.

Flow control techniques can be implemented for mitigating network congestion at the data center 20. However, such techniques are typically complex and expensive to implement, and often have drawbacks. For example, Ethernet retransmissions consume valuable bandwidth at the switch. Some flow control techniques can be applied to an upstream device, requesting it to stop passing packets to the switch fabric 122. Although such techniques are effective at reducing buffer overflow, they do not alleviate network congestion completely. Complex scheduling algorithms are often implemented as well to manage data traffic through the crossbar 124 in order to further reduce congestion-related issues.

The interconnect device 120 can be coupled to an external or "out-of-box" memory device for queuing packets during operation. However, this approach requires additional off-chip pins at the interconnect device 120 and silicon-occupying "copper" connections to the external memory device, resulting in additional footprint constraints and scaling limitations. The addition of I/O ports at the switch fabric 122 also increases the risk of contention for shared resources in addition to complexities arising from managing traffic flows through the crossbar 124.

The present inventive concepts provide an approach where a plurality of processor-based devices such as server nodes are interconnected via a high-bandwidth, large-port memory switch instead of a conventional crossbar-based interconnect device. The memory switch is preferably constructed and arranged to include through-silicon via (TSV) devices. During a data transfer operation, a data packet, frame, and the like can be exchanged between devices, e.g., server nodes and/or external electronic devices, via the memory switch. Here, data from the source device is written to a predetermined memory location at the memory switch, and subsequently retrieved from the memory location for the destination device. The memory switch provides bandwidth at its input ports to accommodate high-speed data exchanges between the interconnected devices. The memory switch can be constructed and arranged to accommodate a target peak load due to a number of accesses by the interconnected devices, while eliminating the need for the input ports and output ports of the memory switch to be dependent on each other during data transmissions through the memory switch. Accordingly, either the input ports or the output ports of the memory switch can receive and process data regardless of the state of the other input ports and the output ports. HOL blocking and other congestion-related problems can be avoided because the memory switch provides specific memory locations for any and all input ports to provide data from where an output port can retrieve the data, instead of relying on a modestly provisioned FIFO queue for queuing data destined for multiple output ports. Thus, the memory switch in accordance with an embodiment alleviates congestion in a data center or cloud computing environment without the need for conventional buffering in the switch fabric, since the available bandwidth, port count, and available memory locations at the TSV memory provide for the receipt of a data packet and for its retrieval for its destination, mitigating or eliminating buffer overflows, dropped data packets, and the like associated with conventional queuing techniques. Accordingly, an output port having a saturated or near-saturated memory output queue in accordance with an embodiment is not subjected to congestion because data packets destined for the output port can be stored at the TSV memory until the output port is available. Also, latency is reduced because the memory switch in accordance with embodiments of the present inventive concepts permits data buffering to occur closer to the point of transmission, i.e., an output port of the memory switch, than conventional buffering. A conventional interconnect device on the other hand relies on complex scheduling, arbitration, and flow control schemes in order to reduce overruns, underruns, and the like.

Figure 3:
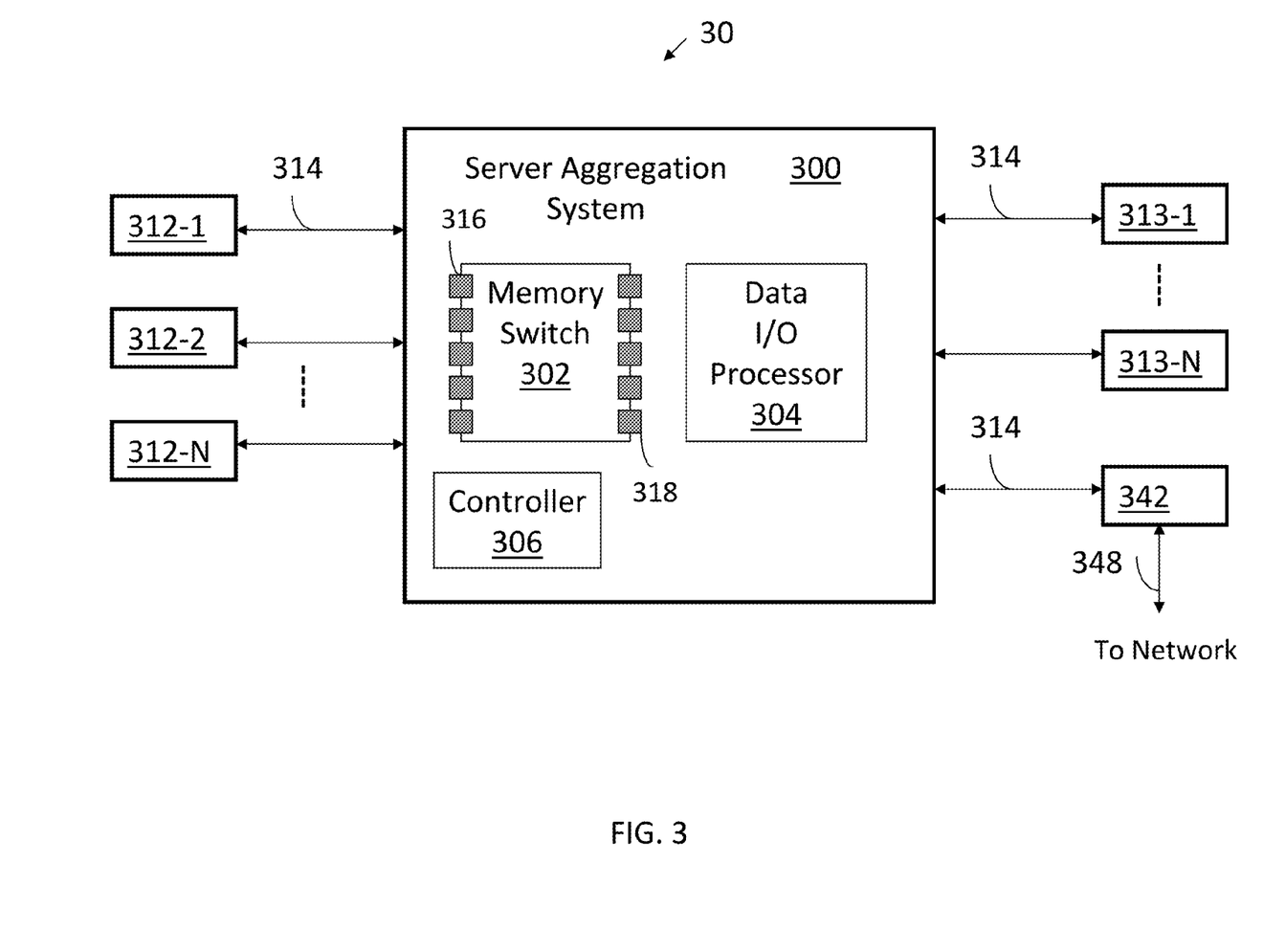
FIG. 3 is a block diagram of a computing infrastructure including a plurality of server nodes in communication with a server aggregation system having a memory switch, in accordance with an embodiment.

FIG. 3 is a block diagram of a computing infrastructure 30 including a plurality of server nodes 312-1 through 312-N (generally, 312) and 313-1 through 313-N (generally, 313) in communication with a server aggregation system 300 constructed and arranged to include a memory switch 302, in accordance with an embodiment. The computing infrastructure 30 can include a large-scale data center, cloud computing environment, and the like.

The server nodes 312, 313 can include single socket servers (SSS), microservers, or other micro-processor devices or electronic devices known to those of ordinary skill in the art. The server nodes 312, 313 can communicate with the server aggregation system 300 over data paths 314 via a PCIe bus or other network connector. The server nodes 312, 313 can be similar to the server nodes 112 described with reference to FIG. 2, so details will not be repeated for brevity. For reasons described herein, the server nodes 312, 313, for example when configured for virtualization, can require less memory, processing power, and energy consumption than the server nodes 112 of FIG. 2 for reasons described herein. The server nodes 312, 313 can be formed on a different chip or other hardware device than the server aggregation system 300, where the server aggregation system 300 can include a plurality of package pins or related interfaces and metal interconnects can provide the data paths 314 with the server nodes 312, 313. Some or all of the server aggregation system 300 can be configured at a chip-level, for example, on-die. Alternatively, the server aggregation system 300 and the server nodes 312, 313 can be co-located at a same hardware device, for example, a chip, modular board, or rack.

In addition to the memory switch 302, the server aggregation system 300 can include a data I/O processor 304 and a controller 306. In an embodiment, the server aggregation system 300 is configured for virtualization, for example, receiving data processed at virtual machines (VMs) of the server nodes 312, 313.

The memory switch 302 includes a plurality of input ports 316, for example, PCIe ports, for receiving data, more specifically, cells, frames, packets, or other units of data arriving via a serial, parallel, or serial and parallel data path 314 from one or more server nodes 312, 313. The received data can be written from the input ports 316 to predetermined locations at the memory switch 302. The memory switch 302 also includes a plurality of output ports 318 for providing data stored at the memory switch 302, more specifically, cells, frames, packets, or other units of data, to a target server node 312, 313 or to a remote device via a physical NIC 342 and an uplink port link 348.

The I/O processor 304 processes data transferred between the memory switch 302 and the server nodes 312, 313 and/or remote computing devices accessible via the physical NIC 342. The I/O processor 304 can examine incoming data packets directed to a server node 312, 313 via the memory switch 302 and the like and route them to their destination, or output data packets to a remote device, for example, via the NIC 342 based on destination address information or other identification fields.

The controller 306 manages a switching control plane (not shown) for data delivery between the server nodes 312 and the server aggregation system 300 by operating network routing protocols, participating in the forwarding of data packets, frames, cells, and the like that are received by the server aggregation system 300. The controller 306 can implement and manage virtual network interface cards (vNICs) (not shown), which can communicate with the I/O processor 304, for example, mapping between virtual and physical addresses. The controller 306 can also communicate with the server nodes 312, 313 for retrieving data from the server nodes 312, 313 and/or providing data to the server nodes 312, 313.

Figure 4:
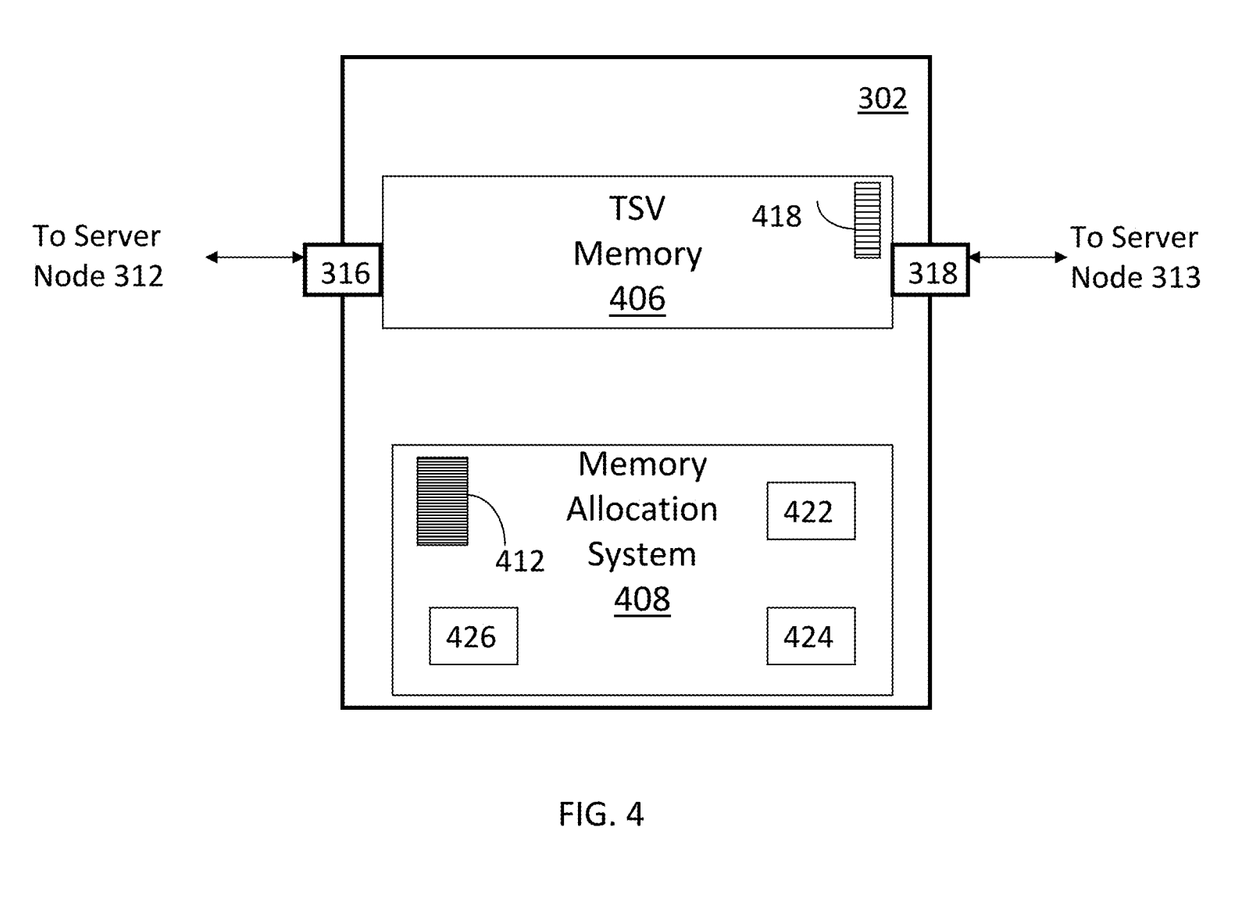
FIG. 4 is a block diagram of components of a memory switch system, in accordance with an embodiment.

FIG. 4 is a block diagram of a memory switch 302, in accordance with an embodiment. In describing the memory switch 302, reference is made to FIG. 3.

The memory switch 302 includes a memory 406 and a memory allocation system 408. In an embodiment, the memory 406 is a shared memory, for example, a TSV DRAM or on die memory. The memory 406 can be configured as part of an interposer or 3D integrated circuit (IC) configuration. The memory 406 receives and temporarily stores data via a plurality of input ports 316. The data can be retrieved from the memory 406 via a plurality of output ports 318.

The memory allocation system 408 can allocate locations of the memory 406 during a data transfer operation between server nodes 312, 313 and/or external electronic devices, for example, a remote computer. The memory allocation system 408 can include a buffer descriptor manager 412, a write controller 422, a read controller 424, and a header processing module 426.

The buffer descriptor manager 412 can include one or more buffers or the like for allocating a set of memory block descriptors pointing to available memory locations, e.g., free blocks of memory, at the memory 406. The buffer descriptor manager 412 can maintain multiple memory block descriptors for creating a linked-list of data blocks at the memory 406. The buffer descriptor manager 412 manages the allocation of buffers, including those buffers returned to the memory allocation system 408 after use.

The write controller 422 writes data from local memory of the server nodes 312, 313 into one or more memory locations of the memory 406. During operation, a server node 312, 313, for example, a guest virtual machine (VM) at the server node, can post new data to its local memory, and notify the server aggregation system 300 that a new descriptor is in the local memory and ready to be fetched and processed. The write controller 422 can read the descriptor pointing to the local memory of the server node 312, 313 where the data is located, and retrieve the data from the local memory according to the descriptor. The write controller 422 can request available memory locations at the memory 406 from the buffer descriptor manager 412. The write controller 422 can be configured to write the data to the memory 406 only when the memory switch 302 is ready to receive the data, providing a level of link congestion management. The write controller 422 can divide data packets, frames, and the like into smaller units in accordance with the configuration of the memory 406, for example, to accommodate a memory block size.

The header processing module 426 can generate a record from a data packet, frame, or other unit of data received by the memory switch 302, and post it to a memory output queue 418 corresponding to a predetermined output port 318 for receiving the data from the memory 406. In an embodiment, the memory output queue 418 is constructed and arranged to provide capacity to store records, which are part of a data packet, and is not required to store the data payload to which the record corresponds. The payload itself can be stored at the memory 406. Accordingly, the memory output queue 418 can be significantly smaller than the output queue 128 described with respect to a conventional crossbar configuration.

The record can include metadata provided by the server node 312, 313, which can relate to data destination information, and can be used to determine a memory output queue 418 for providing the record. The record can include routing hints, for example related to a state for maintaining legacy protocol transparency. The designed output queue 418 preferably corresponds to the output port 318 designated for providing the data to its destination.

The read controller 424 can read a descriptor ring and the like at a target server node 313, fetch the data stored at the memory 406, and provide the data via an output port 318 to the available data locations identified by the descriptor at the target server node 313. Alternatively, the read controller 424 can provide the data to the data I/O processor 304, which in turn communicates with the NIC 342 for remote destination electronic devices via the Ethernet uplink 348. The read controller 424 can use pointer and/or other address information in the memory record stored in the memory output queue 418 to determine the location of the data at the memory 406 from which to retrieve the data. The read controller 424 can be activated to move data to the target server node 313 by the arrival of the data to available buffers at the output port 318. In one embodiment, the read controller 424 is triggered by the arrival of record data in the memory output queue 418. Alternatively, the read controller 424 can be triggered prior to the arrival of record data at the memory output queue 418.

Figure 5:
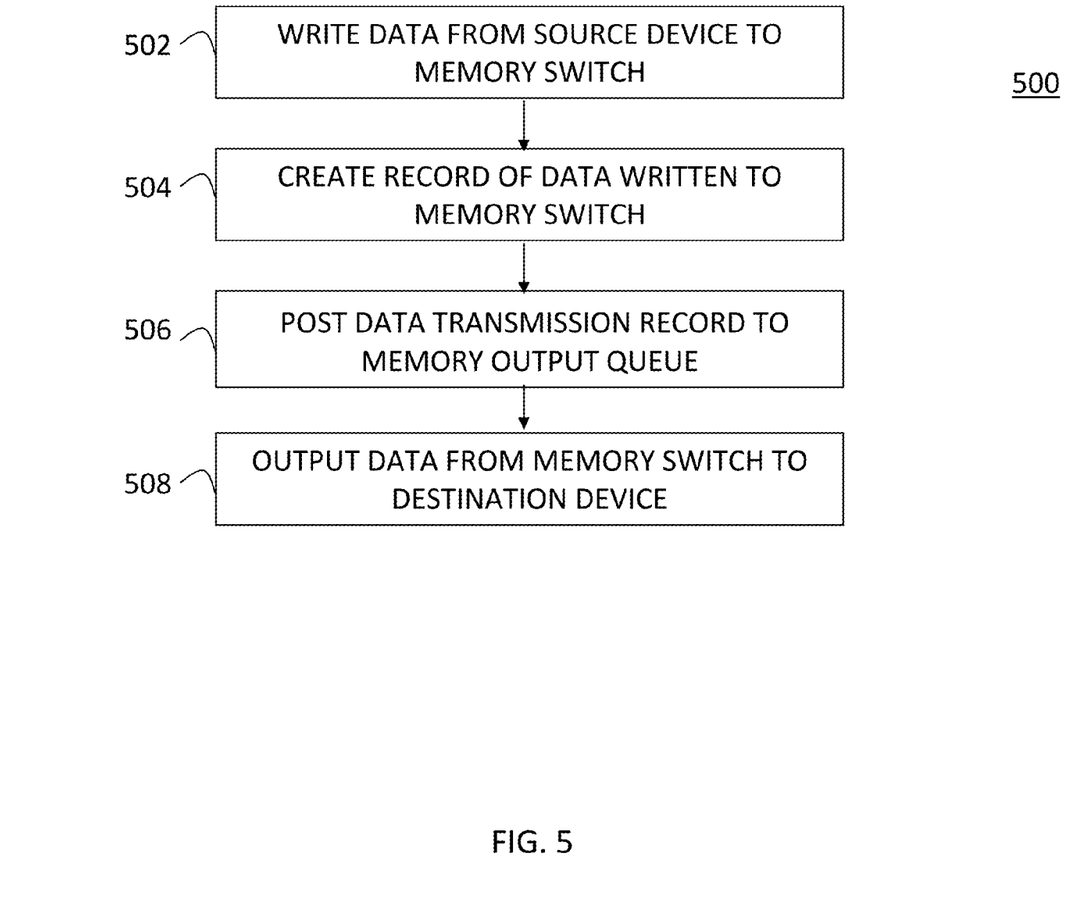
FIG. 5 is a flow diagram of a method for transmitting data between electronic devices in communication with a server aggregation system, in accordance with an embodiment.

FIG. 5 is a flow diagram of a method 500 for transmitting data between electronic devices in communication with a server aggregation system, in accordance with an embodiment. In describing the method 500, reference is also made to FIGS. 3 and 4. Some or all of the method 500 can be performed at the server aggregation system 300. In describing the method 500, server node 312-1 can be referred to as a source server node, and server node 313-1 can be referred to as a target or destination server node. Although the server nodes 312-1, 313-1 are shown and described, remote electronic devices in communication with the server aggregation system 300 via a physical NIC and the like can equally apply.

Prior to the method 500, data is provided by a CPU or other processor at the source server node 312-1 to a local memory of the source server node 312-1. In an embodiment, a guest virtual machine at the source server node 312-1 posts new data at the local memory.

At block 502, the data is written from the local memory of the source server node 312-1 to the memory switch 302. In doing so, the source server node 312 can generate a notification that is sent to the server aggregation system 300 announcing the data availability. The server node 312-1 can include a ring buffer that includes a set of descriptors that point to data in the local memory, which can be accessed by the write controller 422 described herein. The notification information can include a pointer to the data in the local memory of the source server node 312-1 to be moved to the server aggregation system 300. The server aggregation system 300 reads the descriptor, retrieves the data corresponding to the descriptor, and writes the data to the memory switch 302.

The data can be output to the memory 406 as fixed length or variable length packets, frames, cells, or related electronic package of data. The data can be provided by applying time-division-multiplexing (TDM) techniques and the like. The data can be fragmented, linked, or otherwise divided by the server aggregation system 300 into smaller units in order to be written into one or more available memory locations.

At block 504, a record, also referred to as a data transmission record, can be generated of the data stored at the memory 406 of the memory switch 302. The record can include metadata that includes a destination address and the like for the data, a pointer to the memory location of the data, the size of the stored data, and/or related information. The destination address information can include physical, logical, and/or virtual address information. Other record data can include routing hints, for example related to a state for maintaining legacy protocol transparency. For example, this can include data configured to appear as though it is Ethernet data.

At block 506, the data transmission record is output to the memory output queue 418. Each output port 318 has a corresponding memory output queue 418. Accordingly, the memory output queue 418 receiving the record can be determined by the metadata in the record, more specifically, destination information or related identifier provided in the header of the data packet or the descriptor data provided from the source server node 312-1 to the input port 316 of the memory switch 302. The record can include routing data which can be subsequently used for reconstituting Ethernet packets and the like. The memory output queue 418 provides an indexing feature, which can be useful for example when reconstituting an Ethernet packet.

At block 508, the data is fetched from the memory switch 302 and written to a destination device. In one embodiment, the data is output to a target server node 313-1. In another embodiment, the data is output to a destination device external to the server aggregation system 300, for example, a remote device in communication with the server aggregation system 300 via the NIC 342. Prior to outputting data to the target server node 313-1, the read controller 424 can read a descriptor ring at the target server node 313-1 to determine available local memory for receiving the data. The output memory queue 418 can be read to determine from the record corresponding to the data the location of the data at the memory 406 from where to retrieve the data.

Figure 6:
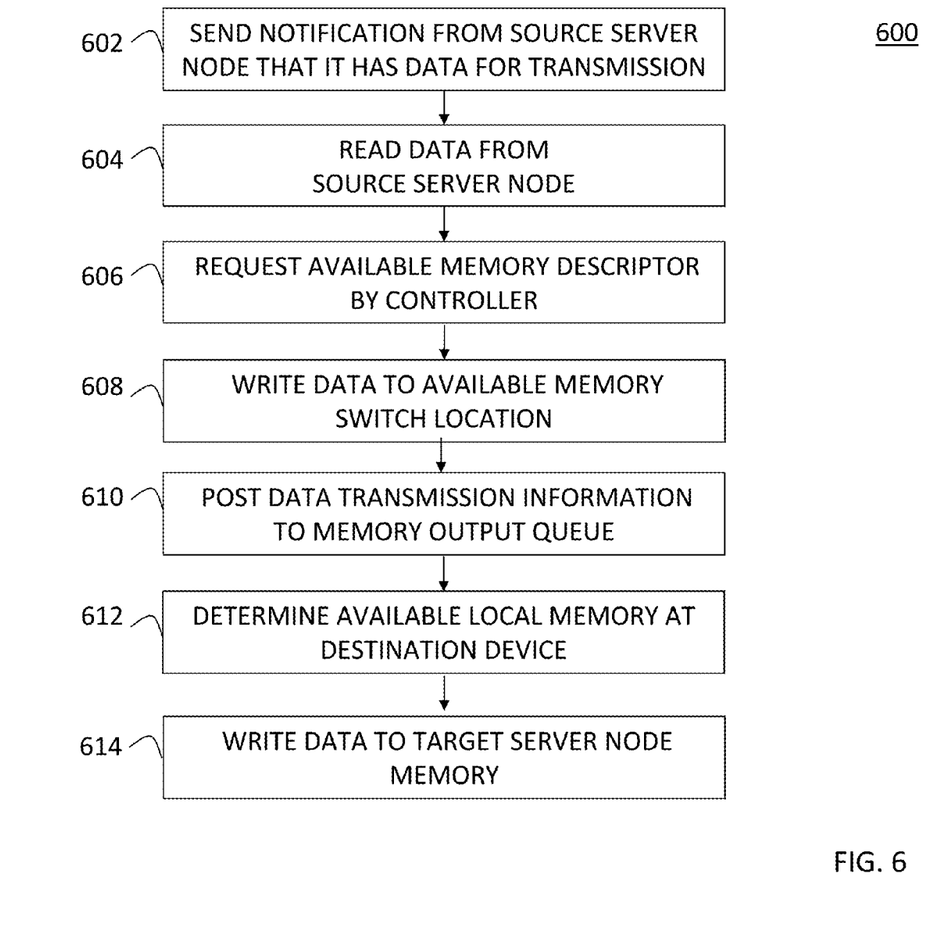
FIG. 6 is a flow diagram of a method for electronic communication between two server nodes in communication with a memory switch, in accordance with an embodiment.

FIG. 6 is a flow diagram of a method 600 for electronic communication between two server nodes 312-1, 313-1 in communication with a memory switch 302, in accordance with an embodiment. In describing the method 600, reference is also made to FIGS. 3 and 4. Some or all of the method 600 can be performed at the server aggregation system 300. In describing the method 600, a server node 312-1 can be referred to as a source server node, and 313-1 can be referred to as a target server node. Although the server nodes 312-1, 313-1 are shown and described, remote electronic devices in communication with the server aggregation system 300 via a physical NIC 342 and the like can equally apply.

At block 602, the source server node 312-1 sends a notification that it has data for transmission to a destination, for example, the target server node 313-1 or a remote electronic device. The source server node 312-1 can include a ring buffer and the like that includes a set of descriptors pointing to the location of data in the source server node local memory. The notification can include a mailbox event or other indicator to the server aggregation system 300 indicating that the data is available for transmission.

At block 604, the server aggregation system 300 can read the ring buffer descriptors. In the event that the data cannot be stored or processed by the server aggregation system 300, the server aggregation system 300 does not pull the data from the source server node (this behavior replaces canonical network operations that sends and then discards such data). This can occur when there are no available input ports or memory locations 406 for receiving the data. This feature provides a level of link congestion management, since the memory switch 302 reads and/or writes data subject to the ability of the memory switch 302 to process the data. In another embodiment, the memory 406 stores the data when the input ports 316 can process the data, even when the memory output queue 418 is saturated or the output ports 318 are unable to receive the data.

At block 606, a request can be made for an available memory descriptor indicating a location at the memory 406 for storing the data. The controller 306 can send a request to the buffer descriptor manager 412 for an available memory descriptor.

At block 608, the data in the local memory of the source server node 312 can be retrieved and written to a location of the memory 406 allocated by the buffer descriptor manager 412.

At block 610, a data transmission record can be generated that includes data transmission information indicating a memory location of the data. The data transmission information can be posted at the memory output queue 418. The record can include metadata that includes a destination address and the like for the data, a pointer to the memory location of the data, the size of the stored data, and/or related information. The memory output queue 418 is determined according to the destination information provided in the record metadata.

At block 612, the read controller 424 can read a descriptor ring or the like at the target server node 313-1 to determine available memory locations at the local memory of the target server node 313-1 has available space in its local memory 104 to receive the data.

At block 614, the data is fetched from the memory 406 according to the posted data transmission information record and provided by the read controller 424 to the destination device. In one embodiment, the data is output to a target server node 313-1. Here, the CPU of the target server node 313-1 can post a receive descriptor pointing to free buffers at the memory. The CPU can notify a vNIC (not shown) and/or the data I/O processor 304 that there are available receive buffers. The vNIC and/or the data I/O processor 304 can fetch the data to move to the target server node 313-1. In another embodiment, the data is output to a destination device external to the server aggregation system 300, for example, a remote device in communication with the server aggregation system 300 via the NIC 342.

Figure 7:
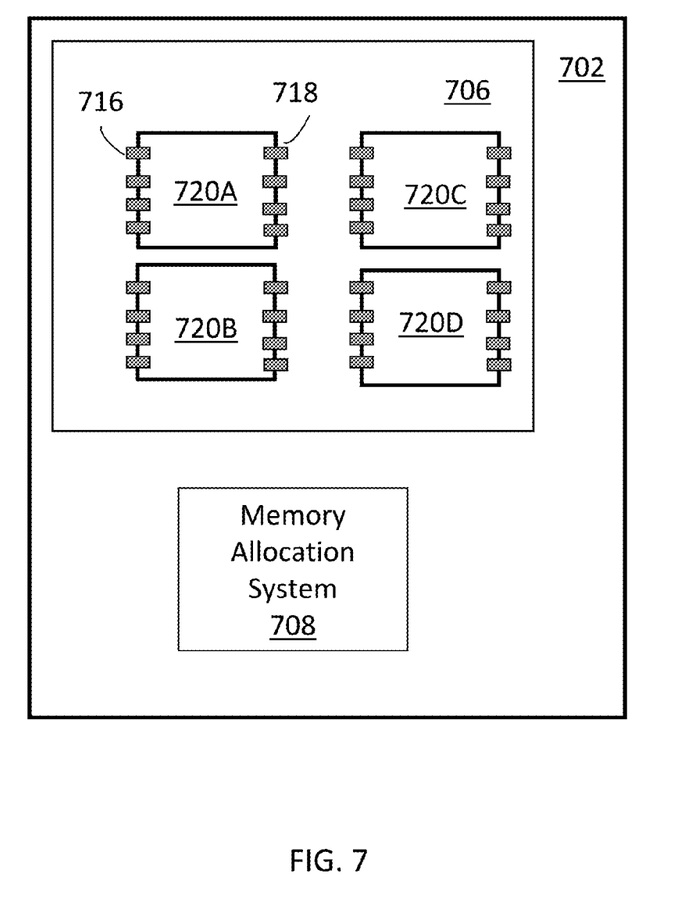
FIG. 7 is a block diagram of a server aggregation system having a memory constructed and arranged to include a plurality of memory partitions, in accordance with an embodiment.

FIG. 7 is a block diagram of a server aggregation system 700 constructed and arranged to include a plurality of memory partitions 720A, 720B, 720C, 720D, in accordance with an embodiment. The server aggregation system 700 includes a memory 706. The memory 706, which is controlled by a memory allocation system 708, similar to the memory allocation system 408 described herein. As described herein, a memory switch in accordance with embodiments of the present inventive concepts can include a large number of input ports and output ports. Each of the input ports can provide data to be switched into memory locations, which are subsequently retrieved and output via the output ports to a destination. The memory switch 702 can minimize issues related to arbitration for the same resources by constructing and arranging a plurality of input ports 716 and/or output ports 718 to correspond with subsections 720A-720B of the memory 706, or to correspond with different memories, each having a subset of ports. For example, the memory switch 702 can have an N×M port configuration, where N and M are each an integer greater than 0, and wherein N and M can be the same or different integers. The M×N configuration can be divided into a plurality of m1×m2 sections, wherein m1, m2 are each an integer less than N, and can be the same or different integers. For example, a 100×100 port configuration can be divided into a plurality of 4×4 memory sections, 4×2 memory sections, and so on. In an embodiment, the number of input ports and the number of output ports of the subdivided memory sections 720A-D are the same. In another embodiment, the number of input ports and the number of output ports of the subdivided memory sections 720A-D are different. In this manner, interconnections between input and output ports are simplified, and can improve I/O efficiency at the memory switch 702.

Figure 8:
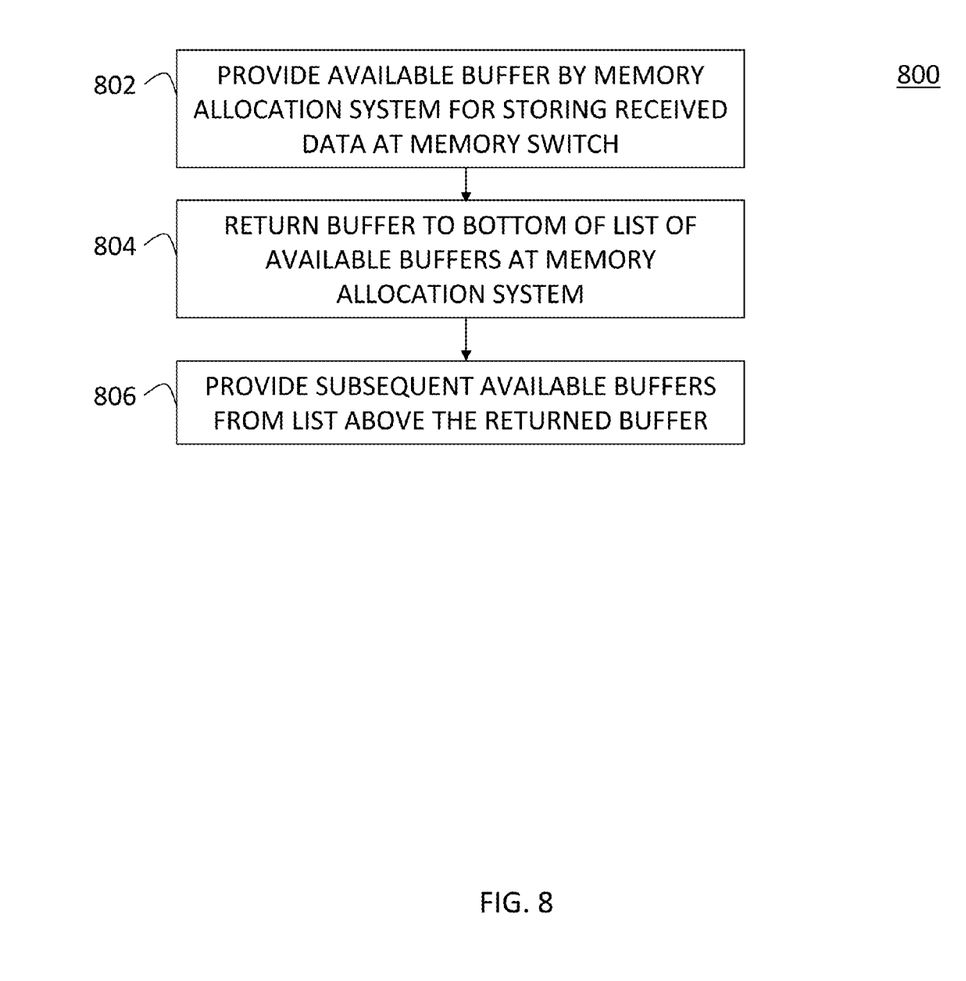
FIG. 8 is a flow diagram of a method for wear-leveling, in accordance with an embodiment.

FIG. 8 is a flow diagram of a method 800 of wear-leveling, in accordance with an embodiment. Some or all of the method 800 can be performed at a server aggregation system referred to herein. Reference is made to elements of the server aggregation system 300, for example, the memory allocation system 408. However, the method 800 can also apply to the server aggregation system 700 of FIG. 7.

At block 802, the memory allocation system 408 provides one or more available buffers for storing data received at the memory switch 302. The memory allocation system 408 can provide buffers from a pool of buffers in a manner similar to that described herein.

At block 804, a buffer for storing data is returned to the bottom of the buffer pool.

At block 806, after returning the buffer to the bottom or end of the buffer pool, the memory allocation system 408 can provide one or more buffers from a pool of available buffers higher in the list of available buffers than the returned buffer. Accordingly, buffers are "cycled" in a manner that prevents buffers from being overused.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A method for performing a data transfer operation, comprising:
    writing data from a first electronic device to a memory switch system comprising a shared through-silicon via (TSV) memory coupled between a plurality of input ports and a plurality of output ports;
    creating a record of the data written to the TSV memory switch system, the record including location information of the data at the TSV memory switch system;
    posting the record to a memory output queue in communication with at least one output port of the plurality of output ports;
    reading the record at the memory output queue;
    reading the data from the TSV memory switch system according to the record; and
    providing the data to a second electronic device.

2. The method of claim 1, wherein at least one of the first and second electronic devices includes a server node.

3. The method of claim 1, wherein the record in the memory output queue includes a location of the data at the TSV memory switch system.

4. The method of claim 1, further comprising identifying the memory output queue for posting the record by examining destination information in the data.

5. The method of claim 1, further comprising:
    examining the data from the output port; and
    outputting the data to the second electronic device in response to examining the data, wherein the second electronic device is a remote electronic device.

6. The method of claim 1, further comprising managing an allocation of buffers at the TSV memory switch system for temporarily storing the data.

7. The method of claim 1, further comprising performing a wear leveling operation, wherein performing the wear leveling operation.

8. The method of claim 1, further comprising:
    providing at the TSV memory switch system a plurality of input ports and a plurality of output ports;
    configuring the memory output queue to be in communication with at least one output port of the plurality of output ports;
    transferring the data from the first electronic device to the TSV memory switch via an input port of the plurality of input ports; and
    receiving by an output port of the plurality of output ports the data from the TSV memory, the output port processing the received data independently of processing by the input port related to the data transferred to the TSV memory.

9. A computer program product, comprising:
a non-transitory computer readable storage medium having computer readable program code embodied therewith, the computer readable program code comprising:
  computer readable program code configured to write data from a first electronic device to a memory switch system comprising a shared through-silicon via (TSV) memory coupled between a plurality of input ports and a plurality of output ports;
  computer readable program code configured to create a record of the data written to the TSV memory switch system, the record including location information of the data at the TSV memory switch system;
  computer readable program code configured to post the record to a memory output queue in communication with at least one output port of the plurality of output ports;
  computer readable program code configured to read the record at the memory output queue;
  computer readable program code configured to read the data from the TSV memory switch system according to the record; and
  computer readable program code configured to provide the data to a second electronic device.

* * * * *